United States Patent [19]

Takahashi et al.

[11] 4,347,780
[45] Sep. 7, 1982

[54] OPERATING VALVE ASSEMBLY FOR A POWER STEERING

[75] Inventors: Koichi Takahashi, Yokohama; Megumu Higuchi; Minoru Watanabe, both of Tokyo, all of Japan

[73] Assignee: Nissan Motor Co., Ltd., Yokohama, Japan

[21] Appl. No.: 121,897

[22] Filed: Feb. 15, 1980

[30] Foreign Application Priority Data

Feb. 19, 1979 [JP] Japan .................................. 54-17167

[51] Int. Cl.³ .............................................. F15B 9/10
[52] U.S. Cl. .................................... 91/375 A; 91/467
[58] Field of Search ........................... 91/375 A, 467; 137/625.24; 180/132

[56] References Cited

U.S. PATENT DOCUMENTS 3,525,362  8/1970  Briggs ........................... 91/375 A X
3,591,136  7/1971  Bishop ........................... 91/375 A X

FOREIGN PATENT DOCUMENTS

2613041  10/1976  Fed. Rep. of Germany .
985230  3/1965  United Kingdom .

*Primary Examiner*—Gerald A. Michalsky
*Attorney, Agent, or Firm*—Thompson, Birch, Gauthier & Samuels

[57] ABSTRACT

An operating valve assembly for a power steering unit comprises inner and outer sleeves in sliding contact with each other and relatively rotatable in response to the twisting of a torsion bar corresponding to a steering load. The outer sleeve is formed in its inner circumferential surface with a plurality of recesses circumferentially spaced apart and having circular opening edges, which recesses are alternately connected to a pump and a drain chamber. The inner sleeve is formed in its outer circumferential surface with grooves establishing communication between adjacent ones of the aforesaid recesses. The outer sleeve is formed with apertures opening into the respective grooves, with the apertures being alternately connected to one or the other of the power cylinder chambers. The operating valve assembly is inexpensive and easy to manufacture.

2 Claims, 18 Drawing Figures

OPERATING VALVE ASSEMBLY FOR A POWER STEERING

BACKGROUND OF THE INVENTION

1. Field of the Invention

The present invention relates to an operating valve assembly for a power steering unit, and more particularly to a rotary operating valve assembly.

2. Description of the Prior Art

As an operating system of the operating valve assembly of this kind can be simplified in construction, it is useful for an operating valve assembly for a power steering unit of a vehicle which is generally required to be compact. On the other hand, however, such an operating valve assembly has various problems in working in that its machining, particularly regarding its finishing with high accuracy of the inner and outer sleeves as main components of the assembly, is difficult and control of tools to be used for cutting the sleeves is troublesome.

A rotary valve for a power steering has been suggested to solve these problems.

Such a rotary valve, however, does not completely solve these problems, but encounters further difficulties in manufacture. With this rotary valve, separate parts such as a plug or the like must be used to form an oil chamber between inner and outer sleeves, resulting in increased number of parts and hence increased manufacturing cost for the parts to be machined with high accuracy. Accordingly, this rotary valve is in fact difficult and highly expensive to manufacture.

SUMMARY OF THE INVENTION

The invention resides in the discovery that an operating valve assembly comprising a rotary valve without any additional parts such as a plug or the like is inexpensive and easy to manufacture.

It is an object of the invention to provide an operating valve assembly for a power steering unit, which solves all the above problems in the prior art by forming inner and outer sleeves to be machined with ease and without requiring any additional parts.

The operating valve assembly for a power steering according to the invention comprises an outer sleeve and an inner sleeve in sliding contact with each other and relatively rotatable for a twisting of a torsion bar corresponding to a steering load, said outer sleeve being formed in its inner circumferential surface with a plurality of recesses circumferentially spaced apart to each other having circular opening edges, said recesses being alternately connected to a pump and a drain chamber, said inner sleeve being formed in its outer circumferential surface with grooves for communicating said recesses adjacent to each other and said outer sleeve being formed with apertures each normally opening into said groove, every other said apertures being connected to one power cylinder chamber with the remainder of said apertures being connected to the other power cylinder chamber.

The invention will be more fully understood by referring to the following detailed specification and claims taken in connection with the appended drawings.

DETAILED DESCRIPTION OF THE PREFERRED EMBODIMENT

FIGS. 1-4 illustrate the operating valve assembly for a power steering according to the invention comprising a valve casing 1, one end of which is provided a rack guide 2 integral therewith for longitudinally guiding a rack 4, and the other end of which is closed by an end cover 3. To the ends of the rack 4 are connected respective knuckle arms to enable vehicle wheels to be steered. The rack 4 is formed with rack teeth 4a and is provided with a power piston 5 (FIG. 3) slidably fitted in a power cylinder 6 to form on both sides of the power piston 5 power cylinder chambers 7 and 8 to which are connected connectors, respectively. When oil pressure is supplied to the left chamber 7 of these chambers, the rack 4 is forcibly shifted to the right as viewed in FIG. 3, so that the both vehicle wheels are steered to the left. On the other hand, when oil pressure is supplied to the right chamber 8, the rack 4 is forcibly shifted to the left as viewed in FIG. 3, so that the both vehicle wheels are steered to the right.

Figure 1:
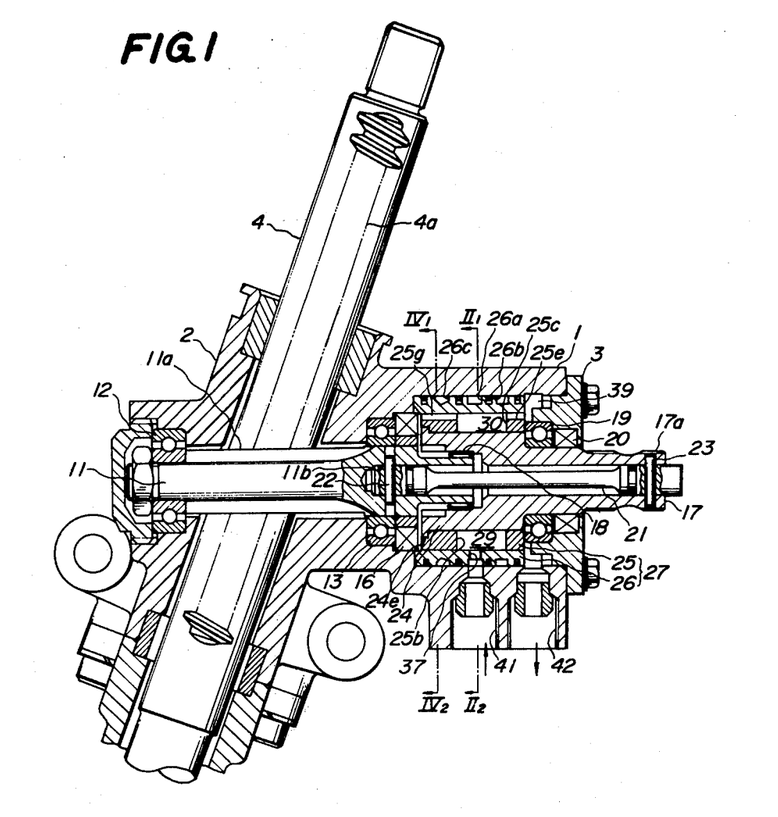
FIG. 1 is a sectional view of the operating valve assembly according to the invention as viewed in arrows of and taken along lines $I_1$-O-$I_2$-$I_3$-$I_4$ in FIG. 2.
Figure 3:
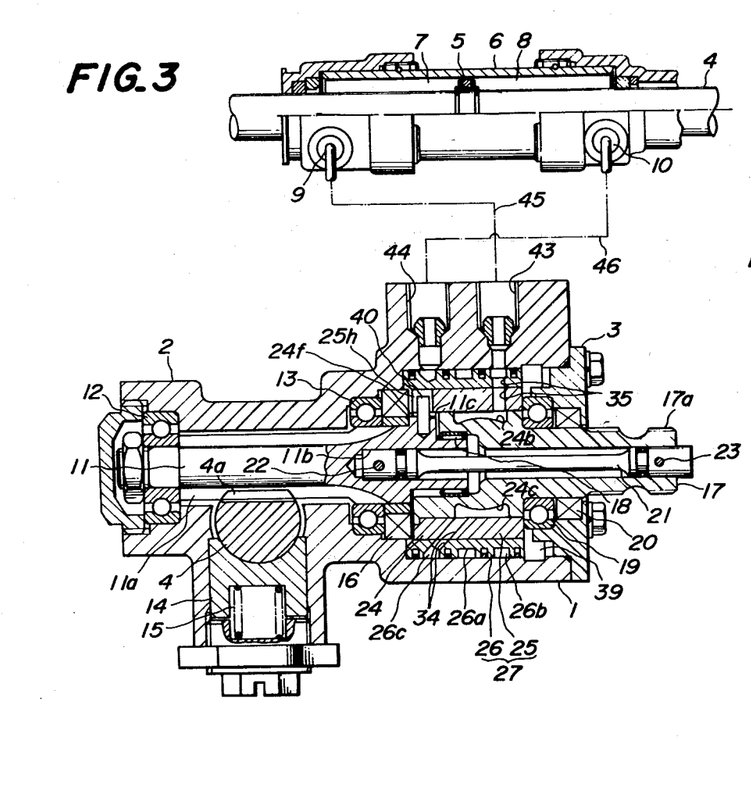
FIG. 3 is a sectional view taken along lines $III_1$-$III_2$-O-$III_3$-$III_4$-$III_5$ in FIG. 2.

As shown in FIGS. 1 and 3, the rack teeth 4a are engaged with a pinion 11a provided on a pinion shaft 11 rotatably supported in bearings 12 and 13. A side surface of the rack 4 on the opposite side of the pinion 11a is supported as shown in FIG. 3 on a column 14 which is urged by a spring 15 toward the rack 4. One end of the pinion shaft 11 extends in the valve casing 1 in a liquid-tight manner by means of a seal 16 and is provided with a stub shaft 17 connectric thereto. Adjacent ends of the both shafts are rotatable relative to each other by means of a needle bearing 18 and the other end of the stub shaft 17 is supported by a bearing 19 in the end cover 3 and extends therethrough in a liquid-tight manner by means of a seal 20. The end of the stub shaft 17 extending through the end cover 3 is formed with serrations 17a which enable the stub shaft 17 to be connected to a steering shaft rotatable with the steering wheel (not shown).

The stub shaft 17 is made hollow into which is inserted a torsion bar 21 having one end being fitted in a blind hole 11b formed in the end of the pinion shaft 11 and integrally connected to the pinion shaft against relative rotation and relative axial movement by means of a pin 22, and the other end being integrally connected to the stub shaft 17 against relative rotation and relative axial movement by means of a pin 23.

Figure 2:
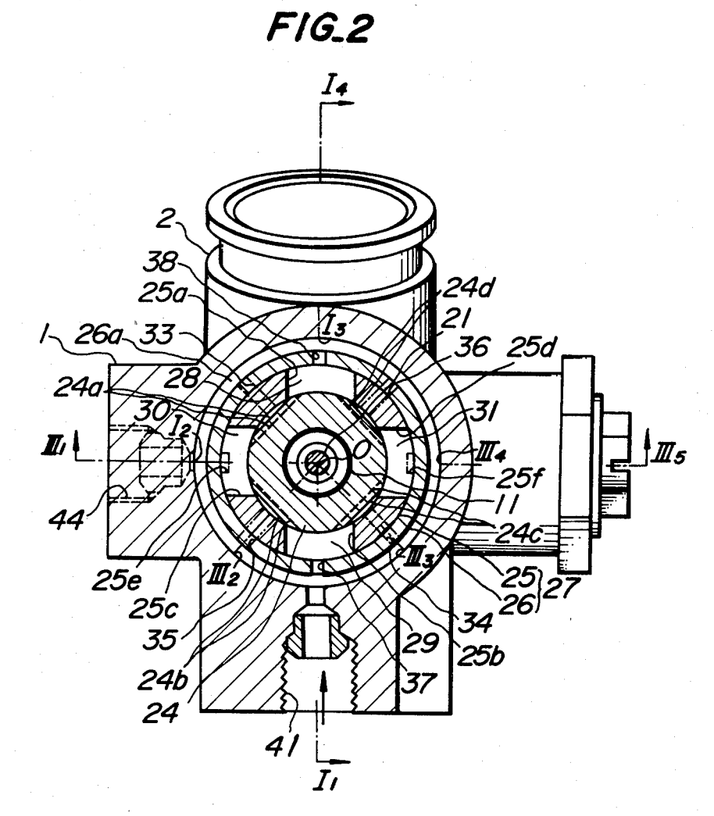
FIG. 2 is a sectional view taken along a line $II_1$-$II_2$ in FIG. 1.
Figure 5:
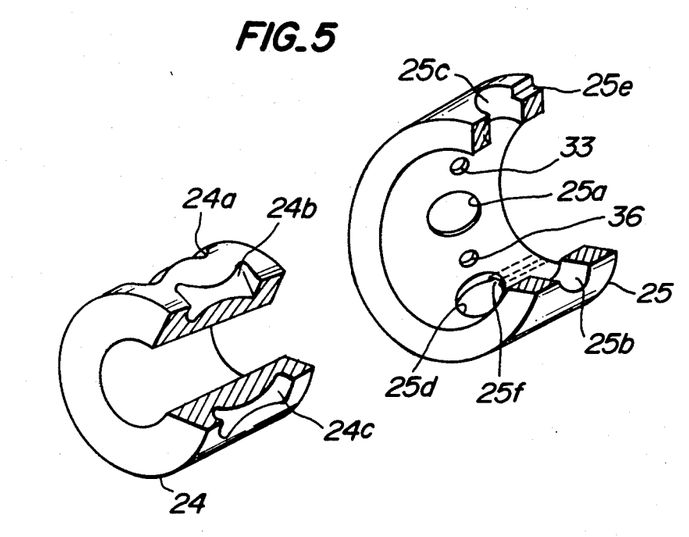
FIG. 5 is an exploded perspective view of an inner sleeve and a first outer sleeve used in the assembly according to the invention shown in FIGS. 1-4.

The stub shaft 17 is integrally formed with an inner sleeve 24 arranged in the valve casing 1. On the inner sleeve 24 is slidably and relatively rotatably fitted a first outer sleeve 25 and on its outer circumferential surface is further fitted a second outer sleeve 26 integrally combined with the first outer sleeve 25 to form an outer sleeve 27. The first outer sleeve 25 is formed for example with four circular bores 25a, 25b, 25c and 25d circumferentially spaced apart as shown in FIGS. 2 and 5 to form with an inner circumferential surface of the second outer sleeve 26 recesses 28, 29, 30 and 31 whose circular opening edges open toward the inner sleeve 24. The second outer sleeve 26 has its outer circumferential surface in slidably contact with an inner surface of the valve casing 1 and formed with three grooves 26a, 26b and 26c. The outer sleeve 27 consisting of the first and second outer sleeves 25, 26 is axially positioned by a bearing 19 and a ridge 24e formed in the inner sleeve 24 as shown in FIG. 1. Although the opening edges of the recesses 28, 29, 30 and 31 are elliptical at the inner circumferential surface of the first outer sleeve 25, for the sake of simplicity and irrespective of the geometric preciseness they will hereinafter be described as "substantially circular opening edges".

Figure 6A:
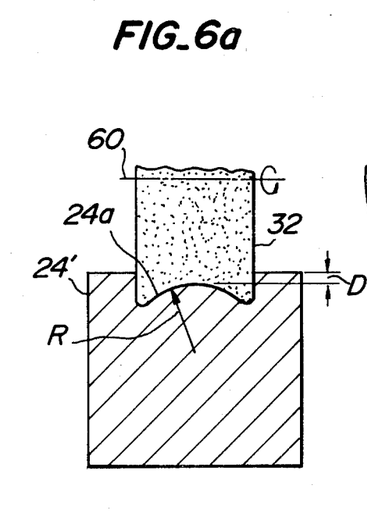
FIGS. 6a and 6b are illustrations for explaining the cutting method of grooves formed in the inner sleeve.
Figure 6B:
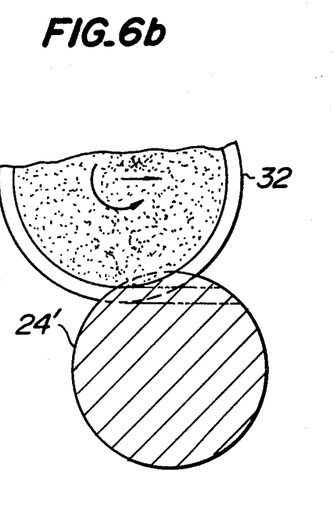

The inner sleeve 24 is formed in its outer circumferential surface with grooves 24a, 24b, 24c and 24d which as shown in FIG. 2, communicate at their opposite ends with adjacent ones of the recesses 28-31. As shown in FIG. 6 for explaining the method of cutting the grooves 24a-24d, these grooves may be easily cut with a grinding tool 32 having a concaved side surface which is rotated about its axis in parallel with an axis of the inner sleeve 24 and is moved in a direction perpendicular to the axis of the inner sleeve 24 as shown in FIGS. 6a and 6b. Preferably, widths of the grooves 24a, 24b, 24c and 24d are substantially equal to the diameters of the circular opening edges of the circular bores 25a, 25b, 25c and 25d.

The outer sleeve 27 is formed with apertures 33-36 radially passing through the first and second outer sleeves 25 and 26, which open at the inner circumferential surface of the first outer sleeve 25 at locations corresponding to the respective grooves 24a, 24b, 24c and 24d. The other openings of the apertures 33 and 34 are commonly communicated with the grooves 26c and the other openings of the apertures 35 and 36 are commonly communicated with the grooves 26b. The second outer sleeve 26 is further formed with through-apertures 37 and 38, through which apertures the recesses 28 and 29 are communicated with the groove 26a. The first outer sleeve 25 is formed with slits 25e and 25f (only slit 25e shown in FIG. 1) extending from the circular bores 25c and 25d, through which the recesses 30 and 31 are communicated with a drain chamber 39 defined between the end cover 3 and outer sleeve 27. As shown in FIG. 1, moreover, the first outer sleeve 25 is formed in its outer circumferential surface with a slit 25g extending from the circular bore 25c in a direction opposite to the slit 25e, through which slit 25 an operating oil is supplied for lubricating the bearing 13 and seal 16.

Figure 4:
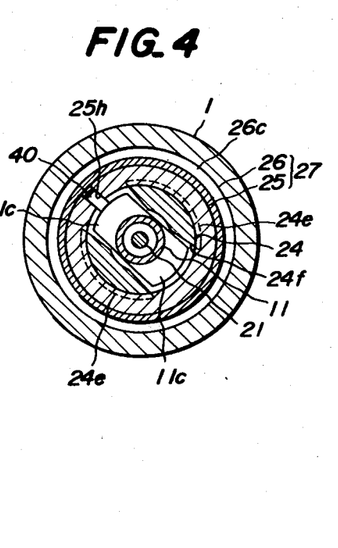
FIG. 4 is a sectional view taken along a line $IV_1$-$IV_2$ in FIG. 1.

As shown in FIGS. 3 and 4, the pinion shaft 11 is integrally formed at its end adjacent to the inner sleeve 24 and radially outwardly extending protrusions 11c which are positioned so as to be fitted within a sector notch 24f of the inner sleeve 24 and are provided with a pin 40 planted in the outer surface of the protrusion 11c. The sector notch 24f has a width somewhat wider than that of the protrusion 11c, so that these protrusions and hence the pinion shaft 11 are rotatable relative to the inner sleeve 24 within an allowable limit, that is, a limit between abutments of side surfaces of the protrusions against walls of the sector notch 24f. The pin 40 is tightly fitted in a notch 25h formed in the first outer sleeve 25 so that the first outer sleeve 25 is rotatable with the pinion shaft 11 in unison.

The valve casing 1 is formed with an inlet port 41 opening into the groove 26a, a drain port 42 communicating with the drain chamber 39 as shown in FIG. 1 and communicating ports 43 and 44 communicating with the grooves 26b and 26c, respectively as shown in FIG. 3. The inlet port 41 is connected to an oil pump and the drain port 42 is connected to an oil reservoir. The communicating ports 43 and 44 are connected through oil passages 45 and 46 and connectors 9 and 10 to power cylinder chambers 7 and 8, respectively.

The operation of the operating valve assembly constructed as above described according to the invention will be explained hereinafter.

FIGS. 1-4 illustrate the operating valve assembly according to the invention in a neutral position. In this position, the ends of the grooves 24a, 24b, 24c and 24d equally open into the corresponding recesses 28-31 as shown in FIG. 2, so that the operating oil fed from the pump through the inlet port 41, groove 26e and through-apertures 37 and 38 to the recesses 28 and 29 escapes through the grooves, recesses 30 and 31, slits 25e and 25f, drain chamber 39 and drain port 42, with the result that any oil pressure does not prevail in the recesses 28 and 29. At the same time the power cylinder chambers 7 and 8 shown in FIG. 3 communicate with the recesses 30 and 31 for drainage through the oil passages 45 and 46, communicating ports 43 and 44, grooves 26b and 26c, apertures 33, 34, 35 and 36 and grooves 24a, 24b, 24c and 24d, so that the rack 4 is not subjected to any driving force.

When a steering wheel is rotated for a steering operation, the pinion shaft 11 is rotated with the stub shaft 17 in unison through a torsion bar 21 which is not deformed by a torsion if the steering load is small, so that vehicle wheels are steered by the longitudinal movement of the rack 4 without any power drive with the operating valve assembly being kept in the neutral position.

Upon steering operation, however, if the steering load is large, the pinion shaft 11 is not rotated with the stub shaft 17 but the torsion bar 21 is twisted in a steering direction to an extent corresponding to the steering load to cause the inner sleeve 24 integral with the stub shaft 17 to rotate relative to the outer sleeve 27 rotative in unison with the pinion shaft 11 by an angle corresponding to the steering load in the steering direction, whereby the operating valve assembly according to the invention performs the power steering operation in the following manner.

Figure 7:
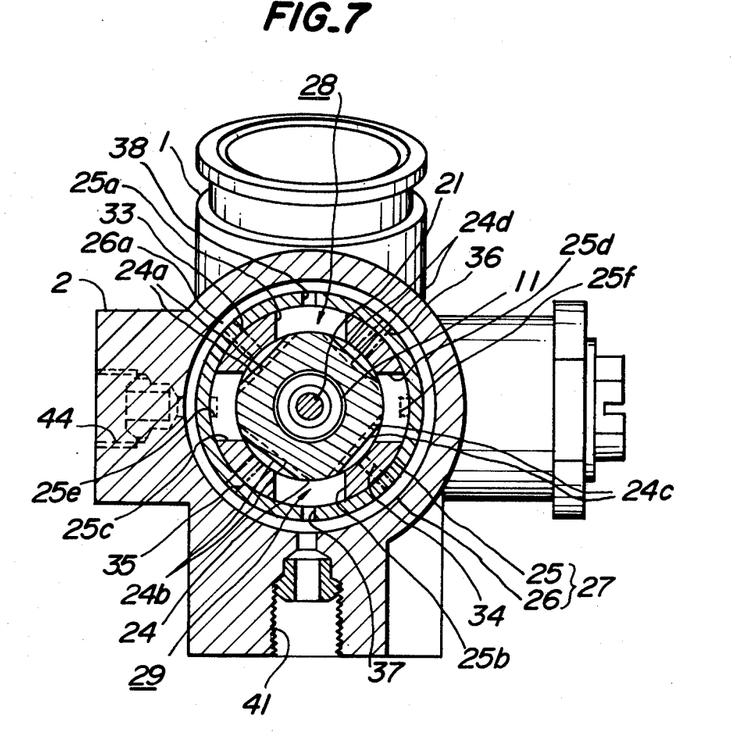
FIG. 7 is a sectional view similar to FIG. 2 for explaining the operation of the assembly shown in FIGS. 1-4.

If a vehicle is steered to the left by a steering operation, the inner sleeve 24 is rotated relative to the outer sleeve 27 in a direction shown in an arrow in FIG. 7 to, for example, the position shown in the drawing. At this time, the respective communicating areas of the grooves 24a, 24b, 24c and 24d with the recesses 28, 30, 29 and 31 decrease at the trailing ends of the grooves as viewed in the rotating direction of the inner sleeve 24 but the respective communicating areas with the recesses 30, 29, 31 and 28 increase at the leading ends of the grooves as viewed in the rotating direction. Accordingly, oil pressure prevails in the recesses 28 and 29 which have been reduced in communication with the recesses 30 and 31. The apertures 33 and 34 communicating with the right power cylinder chamber 8 (FIG. 3) communicated with the recesses 30 and 31 for drainage. The oil pressure prevailed in the recesses 28 and 29 is supplied to the left power cylinder chamber 7 through the grooves 24d and 24b, apertures 36 and 35, groove 26b, communicating port 43 and oil passage 45 to cause the rack 4 to move to the right as viewed in FIG. 3 thereby power steering the vehicle wheels to the left.

If the vehicle is steered to the right by a steering operation, the inner sleeve 24 is rotated relative to the outer sleeve 27 in the reverse direction and oil pressure also prevails in the recesses 28 and 29 in the same manner as above described. In this case, however, the oil pressure in the recesses 28 and 29 is supplied through the grooves 24a and 24c and apertures 33 and 34 to the right power cylinder chamber 8, and the left power cylinder chamber 7 is communicated through the apertures 35 and 36 with the recesses 30 and 31 for drainage, so that the rack 4 is power driven to the left as viewed in FIG. 3, resulting in the power steering to the right.

When the steering operation becomes impossible by stoppage of the operating oil from the pump, the wall of the sector notch 24f as shown in FIG. 4 abuts against the side surface of the protrusion 11c during the relative movement of the inner and outer sleeves 24 and 27. As the result, the rotating torque acting upon the inner sleeve 24 integral with the stub shaft 17 is mechanically transmitted through the protrusion 11c to the pinion shaft 11, thereby enabling a manual steering operation to be effected to avoid an impossibility of the steering operation when the system is failed.

Figure 8:
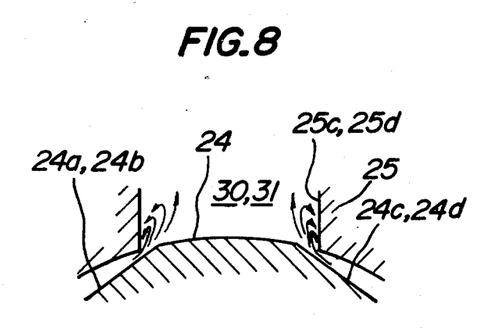
FIG. 8 is a diagrammatic view for explaining an occurrence of cavitations in the assembly according to the invention shown in FIGS. 1-4.
Figure 9:
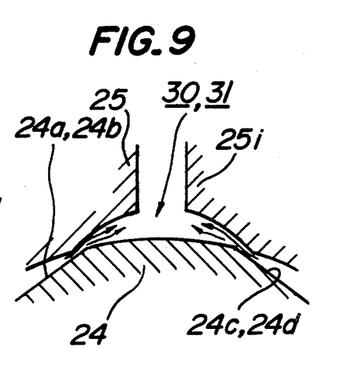
FIG. 9 is a diagrammatic view for explaining how to solve the problems of cavitations according to the invention.

In the above embodiment, the first outer sleeve 25 is formed with the circular bores 25a, 25b, 25c and 25d and is provided with the second outer sleeve 26 fitted thereon to form the recesses 28-31. In order to avoid an occurrence of cavitation or sound of flow caused by vortexes of the operating oil in the recesses 30 and 31 as shown in arrows in FIG. 8 due to rapid change in sectional area of the flow passage for the operating oil flowing toward the recesses 30 and 31 for drainage, according to the invention, the first outer sleeve 25 is formed in its inner circumferential surface with spherical cavities 25i to define the recesses 30 and 31 as shown in FIG. 9, thereby avoiding the rapid change in sectional area of the flow passage for the oil flowing toward the recesses 30 and 31.

Figure 10:
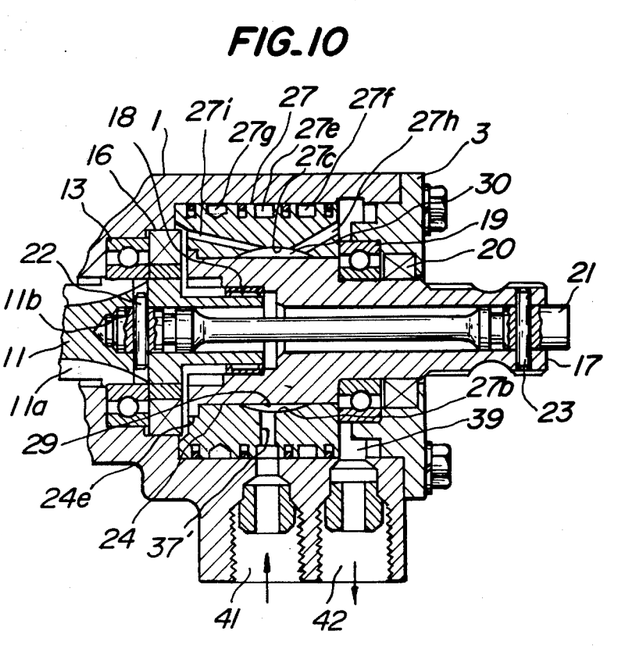
FIG. 10 is a sectional view, corresponding to FIG. 1, of a principal part of a modification of the assembly according to the invention.
Figure 11:
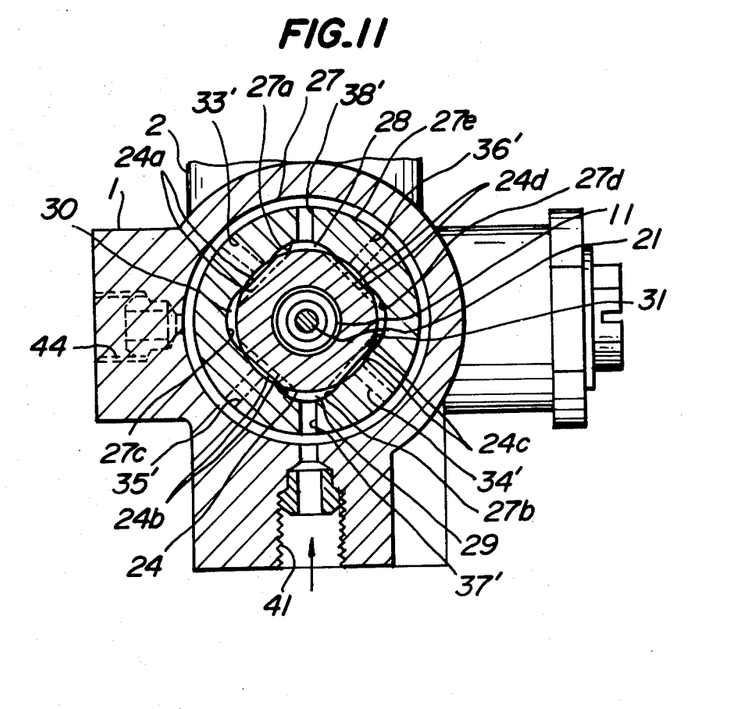
FIG. 11 is a sectional view, corresponding to FIG. 2, of the valve assembly shown in FIG. 10.

FIGS. 10 and 11 illustrates an operating valve assembly according to the invention on the basis of this idea, wherein the outer sleeve 27 is formed in a single part without combining the first and second outer sleeves 25 and 26 in the above embodiment. In this case, the outer sleeve 27 is formed in its inner circumferential surface with spherical cavities 27a, 27b, 27c and 27d in substitution for the circular bores 25a, 25b, 25c and 25d by boring with, for example, a spherical grinding wheel.

The spherical recesses 27a, 27b, 27c and 27d may be formed by a grinding wheel having a convex side surface into the form of concaved or substantially spherical recesses defined by a radius of the grinding wheel in a plane including its rotating axis, a radius of the wheel as viewed in its rotating axial direction and a radius of an inner circumferential surface of the outer sleeve 27. The outer sleeve 27 is formed in its outer circumferential surface with grooves 27e, 27f and 27g in substitution for the grooves 26a, 26b and 26c to form recesses 28-31 similar to those in the above embodiment. The outer sleeve 27 is also formed with apertures 33', 34', 35' and 36' corresponding to the apertures 33-36, the apertures 33' and 34' communicating with the groove 27g and the apertures 35' and 36' communicating with the groove 27f. The outer sleeve 27 is further found with through-apertures 37' and 38' corresponding to the through-apertures 37 and 38, through which the recesses 28 and 29 are communicated with the groove 27e. The outer sleeve 27 is further formed with an oblique aperture 27h corresponding to the slits 25e and 25f and an oblique aperture 27i corresponding to the slit 25g. The oblique aperture 27h communicates the recesses 30 and 31 with a drain chamber 39 and the oblique aperture 27i supplies through the recess 30 the operating oil for lubricating a bearing 13 and a seal 16.

The operating valve assembly of this embodiment constructed as above described is similar to that of the previously described with exception of the different parts as above explained and performs the power steering operation in the same manner as the above embodiment.

Figure 14:
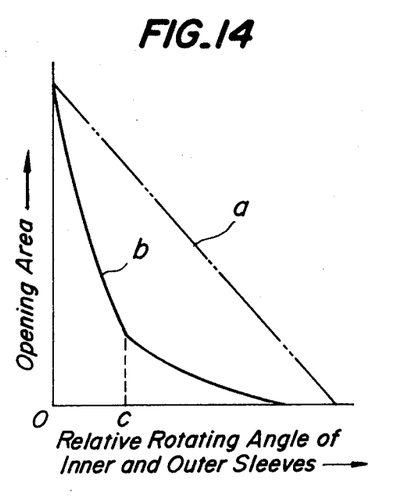
FIG. 14 is a diagram illustrating opening area variation characteristics of the throttling operation with relative rotating angles of the inner and outer sleeves.

In all the above embodiments, the bottoms of the grooves 24a, 24b, 24c and 24d formed in the inner sleeve 24 are convex. By changing radius of curvature R of the convex bottoms and depth D thereat (FIG. 6), the power asisting characteristics of the power steering can be freely selected. In this case, however, variations in opening areas (throttled opening areas defined by the circular opening edges of the recesses 28-31 and edges of the grooves 24a, 24b, 24c and 24d) with relative rotating angles of the inner and outer sleeves 24 and 27 are at a constant rate, for example, as shown in a rectilinear line a in FIG. 14. As the result, the decrease of the opening area is particularly too little in the zone where the power assistance for steering operation begins to start, so that the power assistance characteristic in this zone is dull.

Figure 12A:
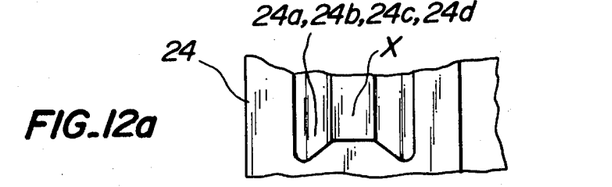
FIGS. 12a and 12b are partial views of the inner sleeve illustrating a modification of the grooves formed therein.
Figure 12B:
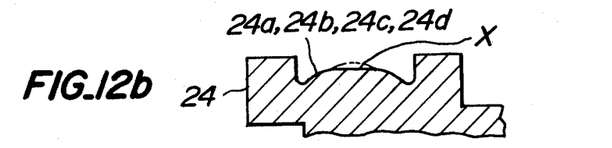
Figure 13A:
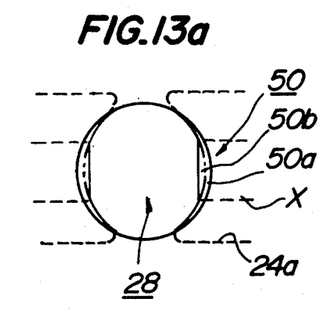
FIGS. 13a–13c are illustrations for explaining the throttling operation of the grooves shown in FIGS. 12a and 12b.
Figure 13B:
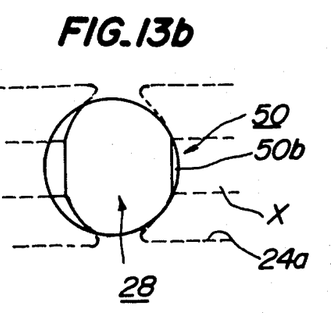
Figure 13C:
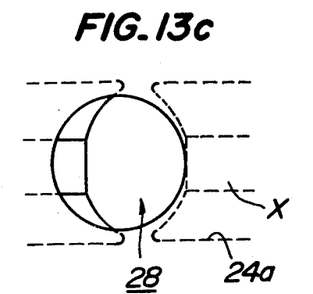

In order to solve this problem, according to the invention the convex bottoms of the grooves 24a, 24b, 24c and 24d are preferably cut at their centers into flat as shown at x in FIGS. 12a and 12b. The throttled opening areas defined by the edges of the grooves 24a and circular opening edges of the recesses 28 will be explained referring to FIGS. 13a-13c hereinafter. FIG. 13a illustrates the throttled opening area 50 consisting of a main crescent opening 50a and a slave arcuate opening 50b. With this arrangement, when the opening area 50 decreases as the inner and outer sleeves 24 and 27 relatively rotate, the main opening 50a disappears first and the operating oil passes therefore only through the slave opening 50b as shown in FIG. 13b. When the inner and outer sleeves further relatively rotate, the slave opening 50b also disappears, so that the opening area 50 becomes zero as shown in FIG. 13c. Such a variation in opening area 50 is illustrated in curves b in FIG. 14. As can be seen from FIG. 14, the opening area 50 rapidly decreases owing to the relatively rapid variation in the main opening 50a from FIG. 13a to FIG. 13b during the relative rotation of the inner and outer sleeves 24 and 27 by c in FIG. 14, thereby improving the sensitivity of the power steering. Thereafter, the opening area 50 slowly decreases owing to the relatively slow variation in the slave opening 50b to FIG. 13c during the further relative rotation of the inner and outer sleeves 24 and 27. Accordingly, the power assistance characteristic of the power steering can be controlled in the desired manner such that the sufficient power assistance can be obtained in the zone where the power assistance begins to start (the zone of small relative rotating angle of the sleeves 24 and 27), while the excess power assistance is suppressed in the zone of large relative rotating angle of the sleeves 24 and 27.

As can be seen from the above description, as the formation of the recesses 28-31 in the outer sleeve 27 is effected only by providing circular bores or by boring with a spherical grinding wheel, the operating valve assembly according to the invention enables the inner and outer sleeves to be worked easily and precisely. The operating valve assembly according to the invention comprises the reduced number of parts because a plug or the like are not needed which would be required for a rotary valve in the prior art. As the grooves 24a, 24b, 24c and 24d of the inner sleeve 24 used in the operating valve assembly according to the invention can be machined in the direction at right angles to the axial direction of the inner sleeve, these grooves can be machined with ease and high accuracy by means of any machining methods, such as broaching, milling or the like, and the assembly is therefore inexpensive to manufacture. According to the invention, furthermore, the drain passage extending from the recesses 30 and 31 for the drainage to the drain chamber can be formed in the outer sleeve 27, so that the working of the aperture for the drainage formed in a stub shaft of the rotary valve of the prior art is not needed, thereby maintaining high the strength of the stub shaft and eliminating the removing operation of burrs after piercing resulting in a simple working of the stub shaft itself.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In an operating valve assembly in fluid connection with a pair of power cylinder chambers, a pump and a drain, said valve assembly having an outer sleeve and an inner sleeve in sliding contact with each other, said sleeves being relatively rotatable in response to the twisting of a torsion bar occasioned by a steering load, said outer sleeve having an inner circumferential surface with a plurality of circumferentially spaced apart recesses, said recesses being alternately connected to pump and drain chambers which are in turn adapted to be connected respectively to said pump and drain, said inner sleeve having an outer circumferential surface with grooves therein which establish a fluid communication between adjacent ones of said recesses, said outer sleeve further being provided with apertures each normally opening into one of said grooves and being alternately connected to one or the other of said power cylinder chambers, the improvement comprising said recesses being spherical, said grooves extending in directions substantially at right angles to the axis of said inner sleeve, and the bottom surfaces of said grooves being convex.

2. An operating valve assembly as set forth in claim 1, wherein said convex bottoms of said grooves are centrally flattened.

* * * * *